US008203110B2

(12) United States Patent
Silvestre Mata

(10) Patent No.: US 8,203,110 B2
(45) Date of Patent: Jun. 19, 2012

(54) DUAL AXLE SOLAR TRACKER

(76) Inventor: Dionisio Silvestre Mata, Guadalajara (ES)

( * ) Notice: Subject to any disclaimer, the term of this patent is extended or adjusted under 35 U.S.C. 154(b) by 286 days.

(21) Appl. No.: 12/513,020

(22) PCT Filed: Jan. 23, 2007

(86) PCT No.: PCT/ES2007/070017
§ 371 (c)(1),
(2), (4) Date: Dec. 24, 2009

(87) PCT Pub. No.: WO2008/090241
PCT Pub. Date: Jul. 31, 2008

(65) Prior Publication Data
US 2010/0139647 A1    Jun. 10, 2010

(51) Int. Cl.
*F24J 2/54* (2006.01)
(52) U.S. Cl. ............... 250/203.4; 126/600; 126/604; 126/605; 136/246
(58) Field of Classification Search ............... 250/203.1, 250/203.3, 203.4; 126/600, 604, 605, 696; 136/244–246, 252
See application file for complete search history.

(56) References Cited

U.S. PATENT DOCUMENTS

| 4,365,617 A | 12/1982 | Bugash et al. | |
| 2003/0172922 A1 | 9/2003 | Haber | |
| 2010/0258110 A1* | 10/2010 | Krabbe et al. | 126/605 |
| 2011/0041834 A1* | 2/2011 | Liao | 126/605 |

FOREIGN PATENT DOCUMENTS

| DE | 202006003476 U1 | 12/2006 |
| JP | 57142447 A | 9/1982 |
| JP | 03251659 A | 11/1991 |

OTHER PUBLICATIONS

International Search Report for PCT/ES2007/070017 dated Jan. 17, 2008.

* cited by examiner

*Primary Examiner* — Kevin Pyo
(74) *Attorney, Agent, or Firm* — Porzio, Bromberg & Newman, P.C.

(57) ABSTRACT

Solar tracker with a principal substructure comprising a series of posts between which sections of beams are arranged, joined by intermediate axles and which can turn in respect of a longitudinal axle; it is also provided with secondary substructures comprising a frame for attachment of the solar panels which rotate in respect of an axle transversal to the longitudinal and with connection parts between the frames and the beams, and in respect of which they are articulated, with the frames being activated by connecting rods joined to a common slide. The centre of gravity of the structure overall is arranged such that it is very close to the longitudinal axle, which facilitates its actuation, reduces wind sensitivity and facilitates erection in addition to being provided with a certain degree of longitudinal tolerance, which enables better use to be made of land, as it is possible to achieve greater power per square meter.

18 Claims, 9 Drawing Sheets

FIG. 3
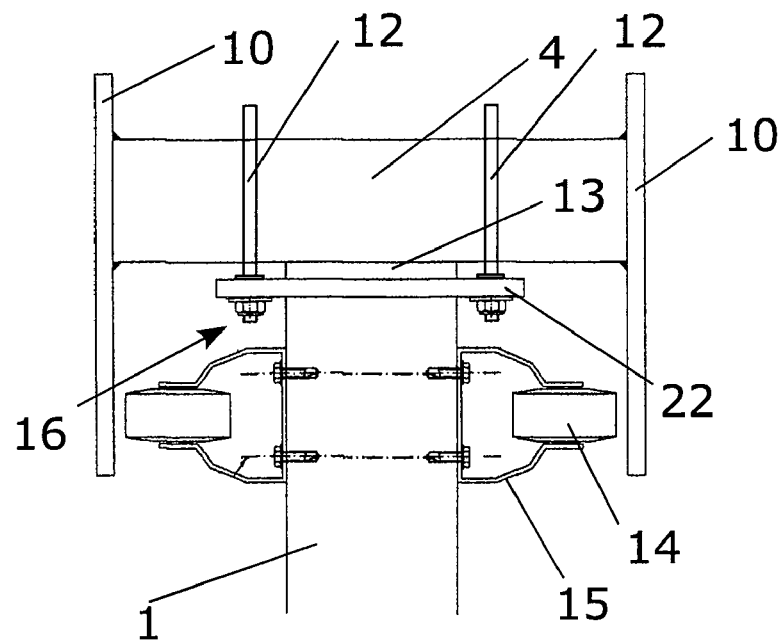
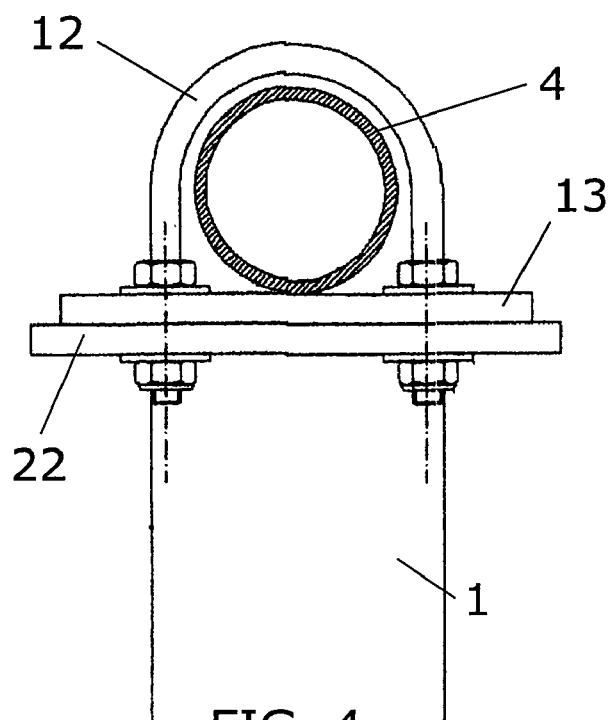
FIG. 4

DUAL AXLE SOLAR TRACKER

OBJECT OF THE INVENTION

The object of this invention is a dual axle solar tracker which acts on panels or photovoltaic solar modules so that they may be oriented towards maximum solar radiation.

The present invention is characterised by the special configuration and design of the elements which make up the tracker which is the object of the invention so that it enables the orientation and actuation of photovoltaic solar modules.

The present invention is also characterised by the arrangement of the centre of gravity of the main structure of the secondary substructures and the solar panels or modules, very close to and beneath the main line of rotation such that the forces to be applied in order to achieve rotation are very small.

The invention is also characterised by the fact that due to its configuration its sensitivity to the wind is clearly reduced, which not only means that obviously less force needs to be applied for its correct positioning but in addition the fact that it is sustained on various supports provides considerable structural advantages.

BACKGROUND TO THE INVENTION

To the present date solar trackers may be provided with a degree of freedom such as two degrees of freedom known in the sector as single or dual axle trackers. The dual axle trackers enable tracking from east to west (azimuth tracking) and elevated tracking, which enables up to 30% more energy to be captured compared with fixed installations.

Dual axle tracking systems currently in the state of the art are provided with photovoltaic panels grouped over large surfaces and are sustained by a single post, which is provided with the means required for providing two degrees of freedom to the surface comprising all the grouped panels, enabling azimuthal orientation and in elevation of the group surface area.

This configuration of the tracker comprising a post with a dual degree of freedom, the upper end of which is provided with a series of photovoltaic panels grouped together and forming a surface, does, however, pose a number of disadvantages.

Generally, for the purpose of maximising the dual axle tracker, the surface to be controlled is usually relatively large, from various dozens of m2 upwards to almost 100 m2. This means that the surface wind resistance is considerable and therefore the structure needs to be enlarged in order to provide it with sufficient resistance, not only to support the wind force, but also the rotation moments resulting from asymmetries in pressure distribution which also requires over-sizing of the actuators in order to control the positioning of the apparatus.

Given that the surface is usually relatively large, in order to orient it in an appropriate manner, the posts are required to be of a certain height, which involves difficulties in erecting each of the trackers, in addition to the fact of their obvious visual impact.

The arrangement of the panels in single post structures hinders the implementation of control algorithms which enable reduction of the impact of the shade projected by nearby structures thus requiring greater separation between trackers.

This distancing between trackers in order to avoid casting shade over each other, implies a less effective use of land in respect of installed power per square metre.

Additionally, in its erection procedure, this type of dual axle tracker mounted on a single post requires a considerable degree of specialisation both in terms of manpower and machinery, and this involves additional costs in terms of materials and time, resulting in considerably higher costs.

Therefore, the objective of the present invention is to overcome the aforementioned disadvantages by developing a dual axle tracker, which on one hand has little wind sensitivity, such that its erection structure has minimum structural resistance requirements, and to facilitate its erection by providing it with a certain degree of tolerance, thus making better use of land as it permits more installed power per square metre.

DESCRIPTION OF THE INVENTION

The invention comprising a dual axle solar tracker basically consists of a mobile solar tracker structure with two degrees of freedom. The structure comprises a main substructure with rotation capacity with respect to a longitudinal axle in respect of the structure overall. It also comprises secondary substructures which act as frames on which the panels or photovoltaic modules may be jointly affixed. The secondary structures or frames are joined to a main substructure and may each rotate in respect of an axle transversal to the longitudinal axle by means of a connecting rod.

The rods activating the rotation of the secondary substructures or frames are joined at their lower end to a common slide such that by means of said slide the same rotation is achieved for all the panels or photovoltaic modules.

Therefore, the collection surface is divided into a configuration similar to a Venetian blind, that is, each panel or photovoltaic module rotates in a synchronised manner permitting a reduction of the actuation moments to extremely manageable values.

The main substructure comprises a series of posts fixed to the ground and distributed regularly, between the ends of which beam sections are arranged, connected by intermediate axles or joined to the end beams by means of end axles.

The intermediate axles joining the consecutive beam sections are attached to the upper ends of the beams and supported on an ant-friction part; this arrangement enables erection with a certain degree of tolerance in the longitudinal direction resulting in a reduction in costs, not only of the parts used, but also of the manpower required for erection, as opposed to other dual axle trackers which require a high degree of precision.

The arrangement of the beam sections of the main substructure is relatively displaced in respect of the longitudinal axle rotation, such that the apparatus centre of gravity, that is, of the principal and secondary substructures remains relatively closer to the main rotation axle so that turning torque will be reduced to a minimum.

In addition, it is sought to place the centre of gravity not only close to the axle of longitudinal rotation but also below the axle, so that during erection of the secondary substructures or frames there is no turning torque which could overturn the apparatus.

Rotation of the principal substructure with respect to the longitudinal axle is achieved either by a single actuator with one of its ends fixed on to one of the posts, while the other end of the actuator is fixed to a structure arranged on the ends of two consecutive beam sections, or alternatively said rotation of the principal substructure may be achieved by means of a dual set of actuators arranged in a "V" shape, activating a structure for the transmission of forces arranged in a manner transversal to the longitudinal axle of the structure and on one of the intermediate connecting axles between two consecutive beam sections.

In addition, in order to produce rotation of each of the panels or photovoltaic modules, a second actuator is provided fixed on the previous structure for the transmission of forces onto the beam, so that the end of said second actuator is fixed on the slide which runs parallel to the tracker apparatus.

Due to the constructive characteristics indicated, the following advantages are obtained:
- On one hand, the apparatus has a certain degree of longitudinal tolerance, which facilitates erection and reduces the costs of parts required in the absence of this advantage.
- In addition, the final structure obtained is a tracker apparatus with reduced sensitivity to high wind speeds which implies a structural apparatus with less resistance requirements.
- The actuation moments or torque on the collection surface are obviously reduced as they are provided with a Venetian blind configuration.
- Greater surface area is achieved since it is possible to install more power per square metre which implies a cost saving in terms of land.
- The tracker apparatus does not require enormous effort to obtain the rotation of the apparatus in respect of the longitudinal axle, as the centre of gravity of the rotation axle is presented to the longitudinal rotation axle of the main substructure.
- Erection is also facilitated as the centre of gravity is arranged below the longitudinal axle of rotation, avoiding any possible overturning of the structure apparatus.

DESCRIPTION OF THE DRAWINGS

In order to supplement the description below and to provide a better understanding of its characteristics, the present descriptive report is accompanied by a set of plans in which the figures represent, in an illustrative manner which is in no way restrictive, the most significant details of the invention.

FIGS. 3 and 4 show respectively a detail of a front and lateral view of the intermediate connection axle represented in FIG. 2.

PREFERRED EMBODIMENT OF THE INVENTION

In the light of these figures, below a preferred embodiment of the proposed invention is described.

Figure 1:
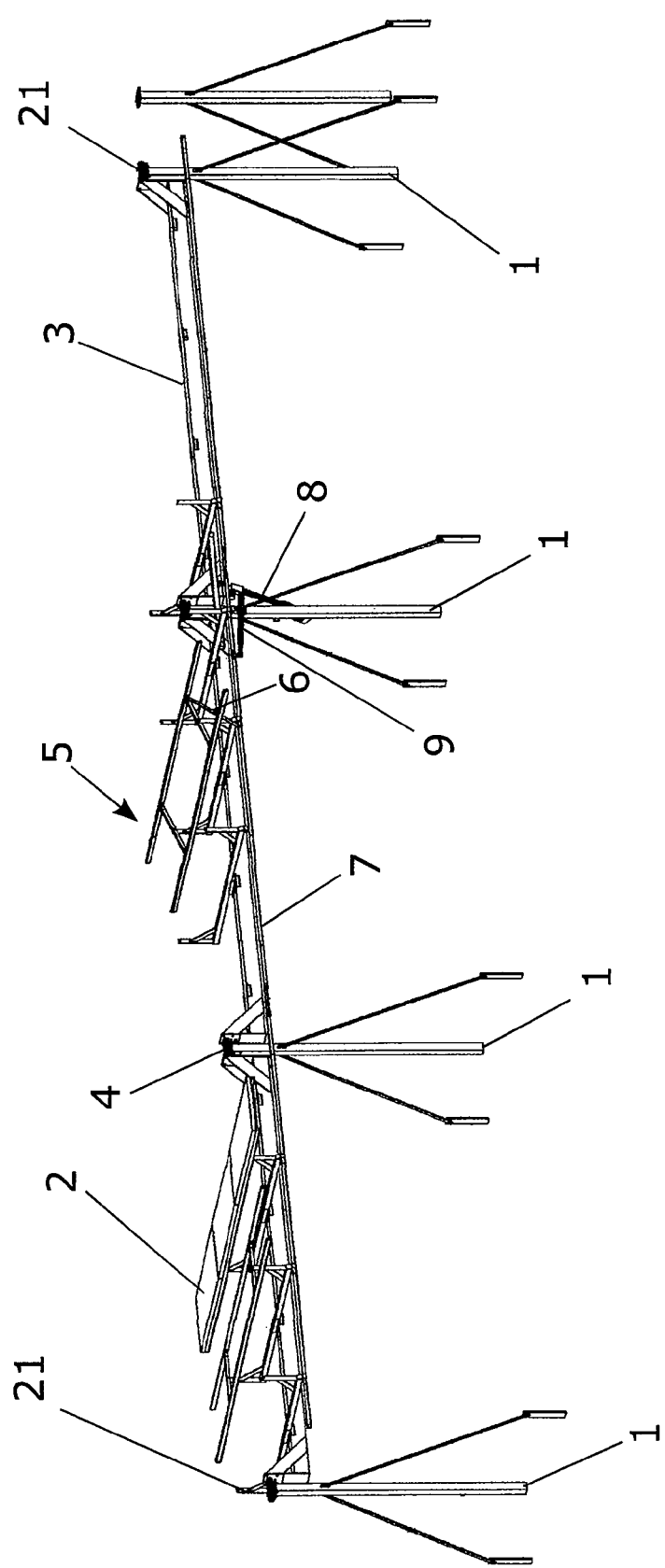
FIG. 1 shows a perspective view of a dual axle solar tracker such as that which is the object of the present invention.

In FIG. 1 we note how the dual axle solar tracker which is the object of this invention is provided with a principal substructure with rotation capacity in respect of a longitudinal axle in respect of the structure overall. It is also provided with secondary substructures which act as frames on which the panels or photovoltaic modules are jointly attached. The secondary structures or frames are connected to the principal substructure and each may rotate with respect to an axle transversal to the longitudinal axle by means of a connection rod.

The principal substructures comprise a series of posts (1) fixed to the ground and distributed in a regular manner, on which beam sections (3) are arranged, connected by intermediate axles (4). On the end posts (1) the beams (4) are attached by end axles (21).

Figure 5:
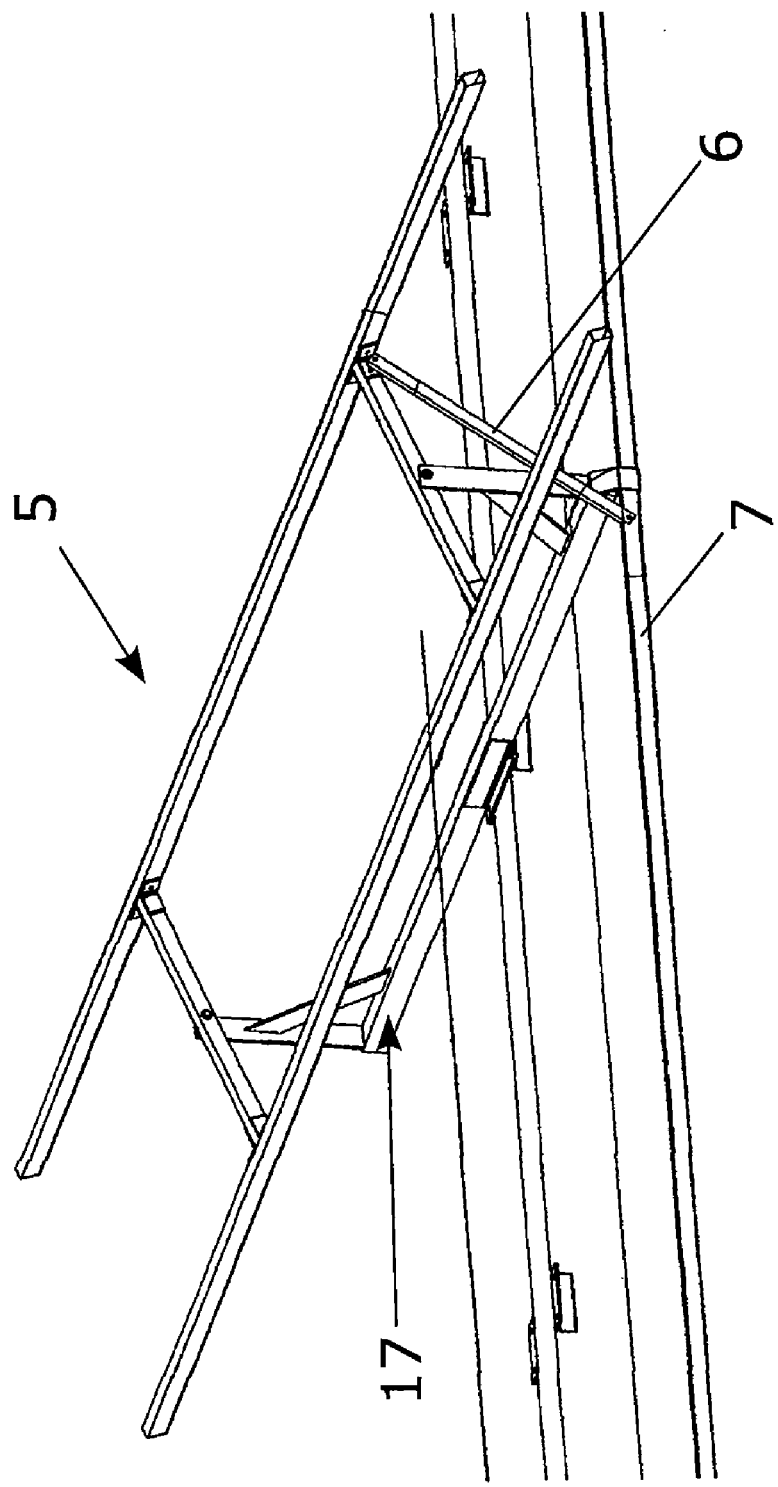
FIG. 5 shows a detail of the secondary substructure or frame for attachment of the panels or modules at their connection with the principal substructure as well as the means of activation.

The secondary substructure comprises frames (5) which support and to which each panel or photovoltaic module (2) are attached. These frames (5) are attached to the main substructure by means of a "U"-shaped support (17) (FIG. 5).

All the frames are activated in an individualised and simultaneous manner by a slide (7).

This first figure also shows a first actuator (8) for activating rotation of the principal substructure, as well as a second actuator (9) which activates the slide (7).

Figure 2:
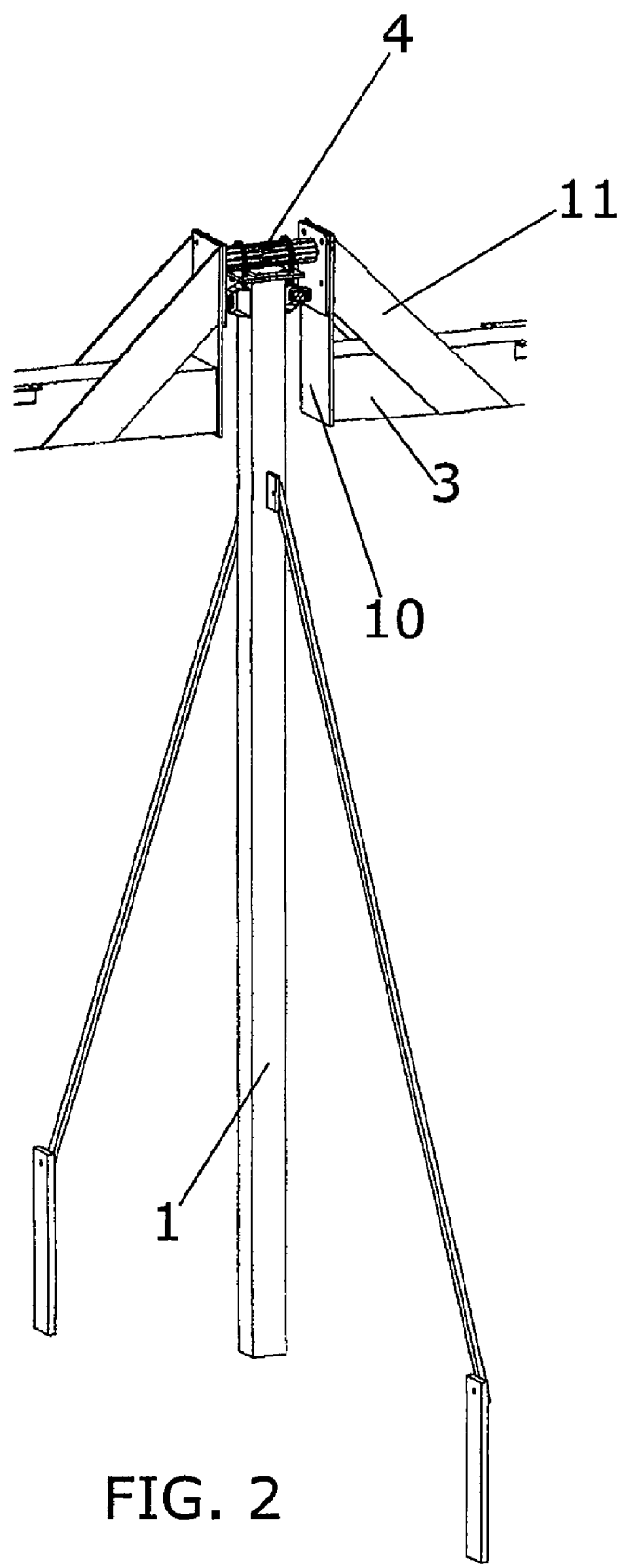
FIG. 2 shows a perspective detailed view of an intermediate axle connecting two consecutive beam sections of the principal substructure.

FIGS. 2 to 4 show in detail an intermediate axle connecting two consecutive sections of beam (3). As may be seen, the beam sections are slightly displaced in respect of the longitudinal axle rotation, owing to the fact that it is attempted to place the centre of gravity of the whole structure as close as possible to that axle, such that the force required to turn the apparatus will be reduced to a minimum. In addition as we have commented, it is sought to place the centre of gravity below the axle of longitudinal rotation so that during erection there is no risk of overturning the secondary substructures The connection between the consecutive beam sections (3) and the intermediate axle (4) is made by means of terminal vertical parts (10) reinforced by brackets (11).

An attachment board (22) is fixed to the upper end of the posts on which another anti-friction board (13) is attached which may be made from, for example, Teflon or similar material. Resting on the anti-friction board (13 the intermediate axle is affixed (4) by means of metal clamps (12) attached with screws (16) to the attachment board (22).

On the sides of the post and at its upper end jubilee clips (15) are arranged for fixing the rollers(14) which prevent displacement, however these allow a certain degree of tolerance in the longitudinal direction.

FIG. 5 shows a secondary substructure which comprises a support and attachment frame (5) for each of the panels of photovoltaic modules. This frame (5) is articulated on the ends of a support apparatus (17) which is "U" shaped and which is attached on the beam sections (3).

The end of a connecting rod (6) is fixed to each of the frames (5) with the other end of the rod (6) being attached in an articulated manner on a slide (7) so that the displacement of said slide (7) causes the rotation of each of the frames (5) in an individual but simultaneous manner.

Figure 6:
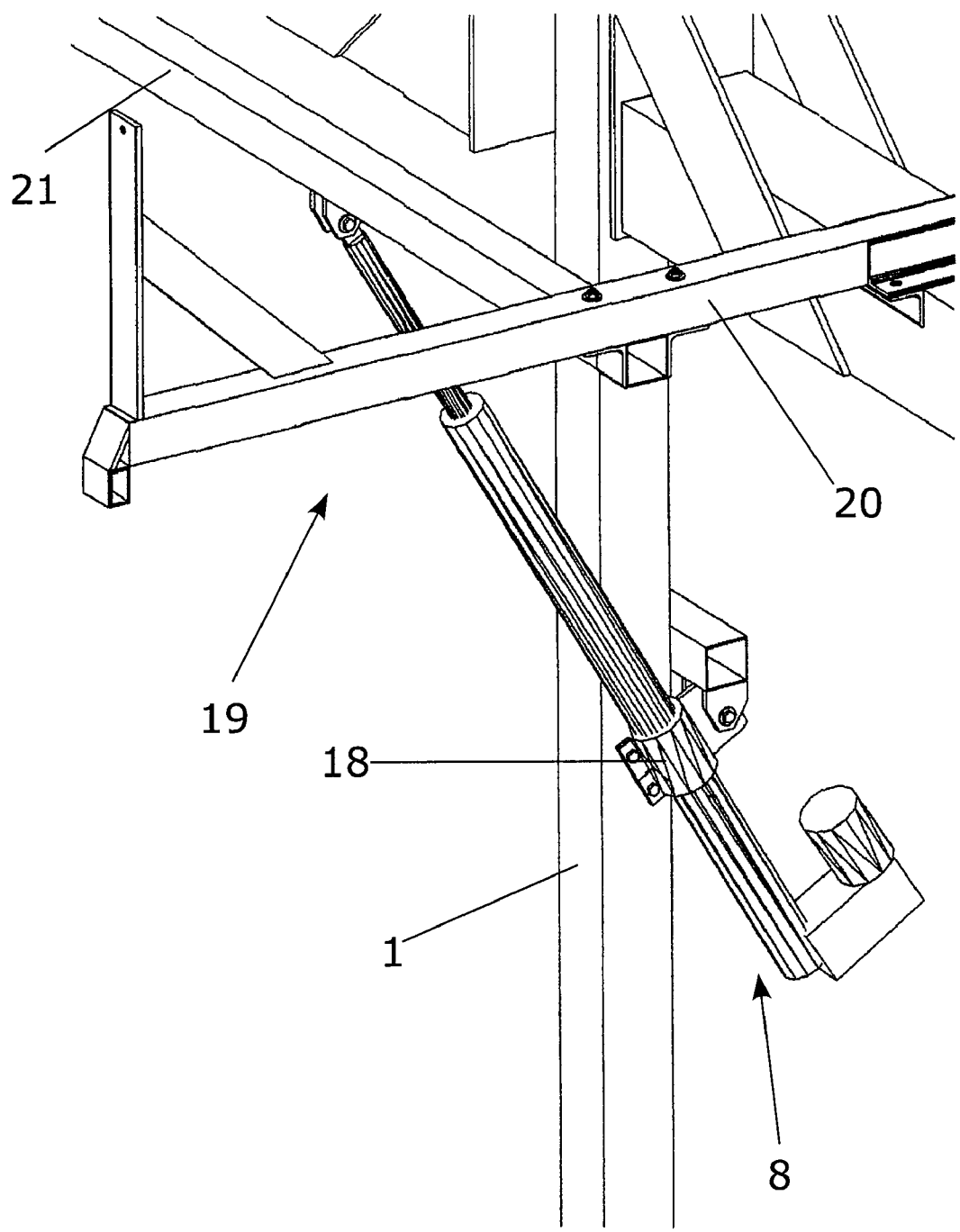
FIG. 6 shows a detail of the means of actuation employed to rotate the principal substructure.

FIG. 6 shows a first mode in which the principal substructure is rotated by means of an initial actuator (8). This initial actuator (8) is attached to the post (1) by means of a clamp (18) with the end of the actuator attached to a force transmission structure (199 in order to produce rotation.

The force transmission structure (19) comprises a pair of transversal bars (20) attached on the ends of the consecutive beams (3) and arranged on both sides of the intermediate axle joined together by another pair of bars (21) connection the transversal bars (20) with the activated end of the actuator (8)

being attached in an articulated manner to the connection bars (21) of the transversal bars (20).

Figure 7:
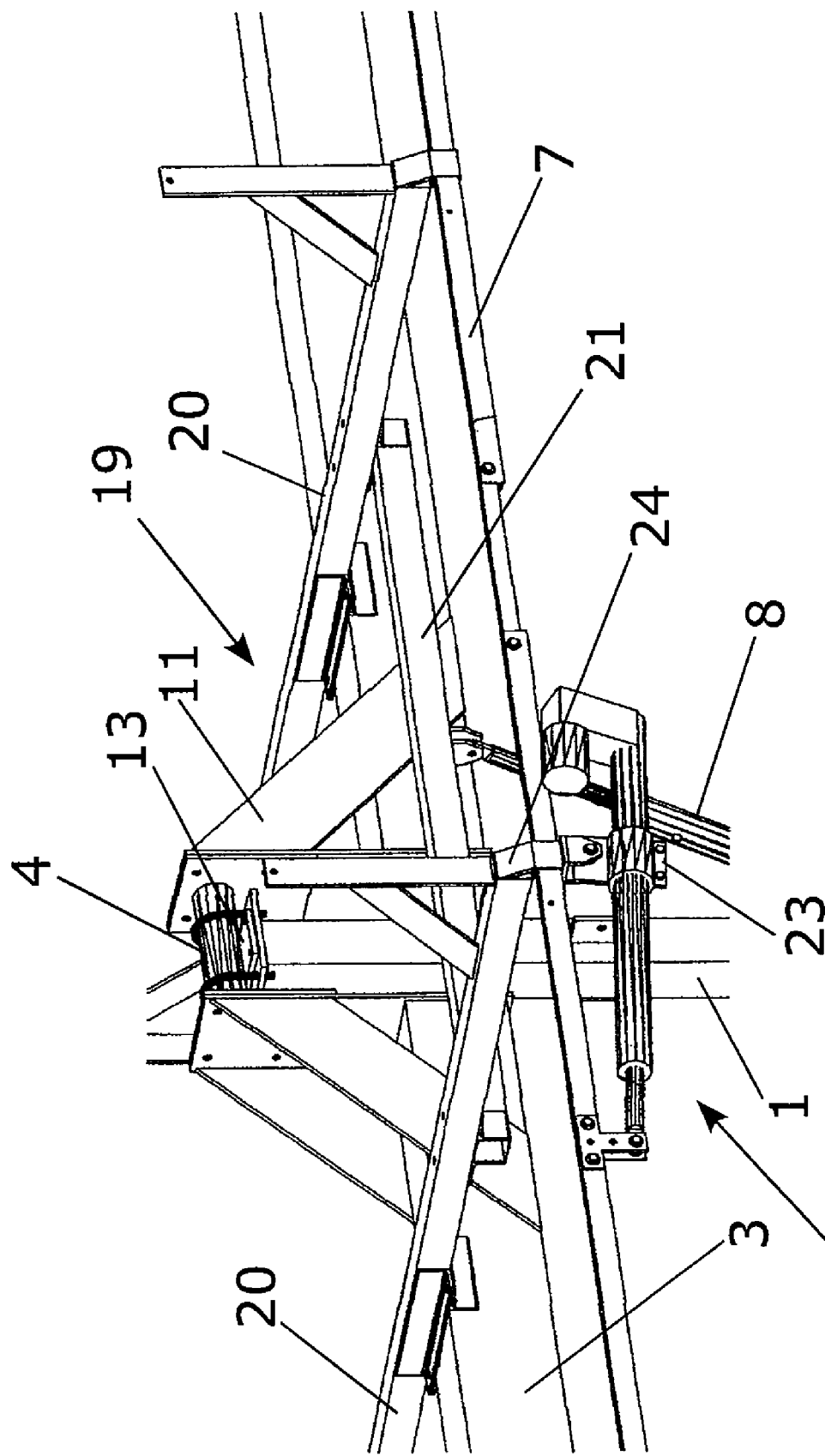
FIG. 7 shows in detail a second means of actuation for individualised yet simultaneous rotation of the panels or photovoltaic modules.

Finally, FIG. 7 shows how the action of a second actuator (9) is carried out on the slide (7).

This second actuator (9) is attached by means of a clamp (23) to the force transmission structure (19), and at its acting end is joined in an articulated manner to the slide (7).

The slide (7) in turn is suspended from the force transmission structure (19) by means of a yoke (24) which permits linear movement of the slide (7).

Figure 8:
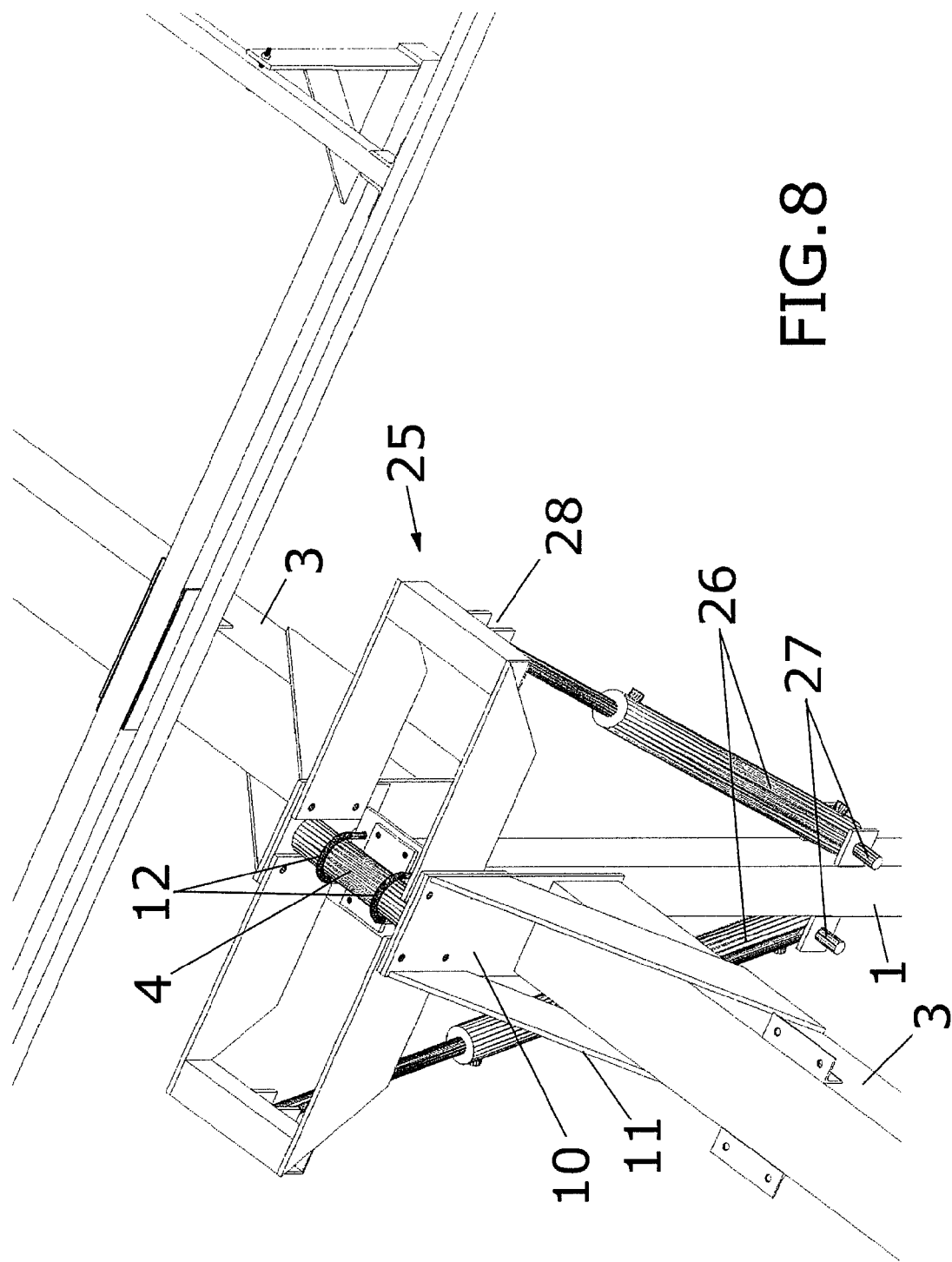
FIGS. 8 to 10 indicate with a different degree of detail the actuation of the principal substructure by means of a double set of actuators arranged in a "V" form on one of the posts.
Figure 10:
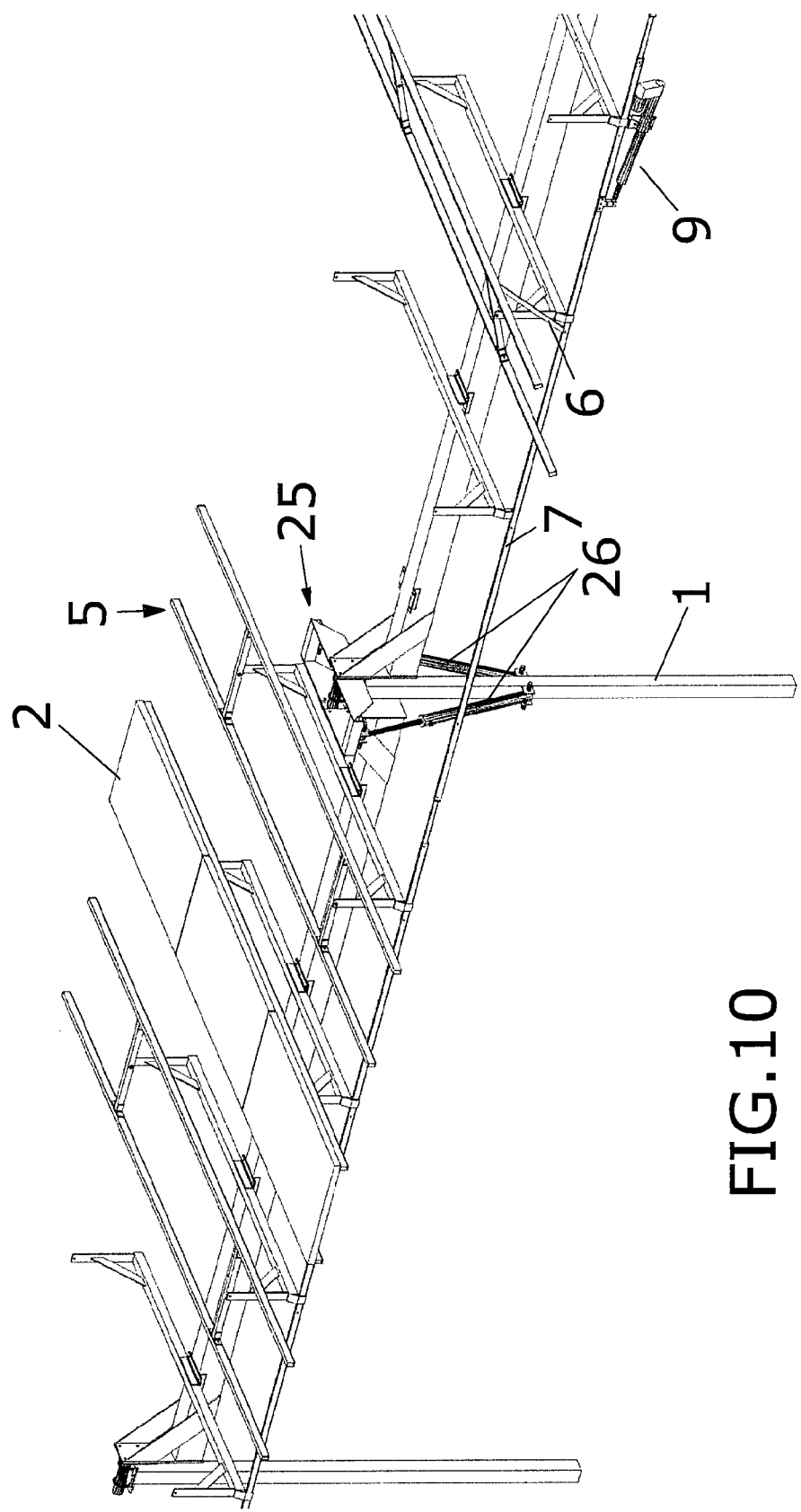

FIGS. 8 and 10 show as commented previously, an alternative means of rotating the principal substructure in respect of the longitudinal axle, being based on the use of a double set of actuators (26) arranged in a "V" shape and a force transmission structure (25).

Both the "V" shaped actuators (26) and the force transmission structure (25) are contained in a plane perpendicular to the plane containing the longitudinal axle of the apparatus and arranged on a section of intermediate axle (4) which connects tow consecutive sections of beam (3).

The "V" shaped actuators in a preferred but not restrictive embodiment are hydraulic with interconnecting chambers and in which the pump although not represented, is installed in the same "V" shape. Another alternative possibility would be to use a centrals hydraulic systems for all possible actuators arranged in "V" shape.

The force transmission structure (25) emerges transversally from the longitudinal axle reaming attached to the terminal parts (10) which are fixed on the ends of the beam sections (3). Each one of the actuators of the double set of actuators (26) in "V" shape is joined at its lower end to the posts (1) by means of an articulated connection (27), while the upper end of each of the actuators (26) is joined to the force transmission structure (25) by means of an articulated connection (28).

Figure 9:
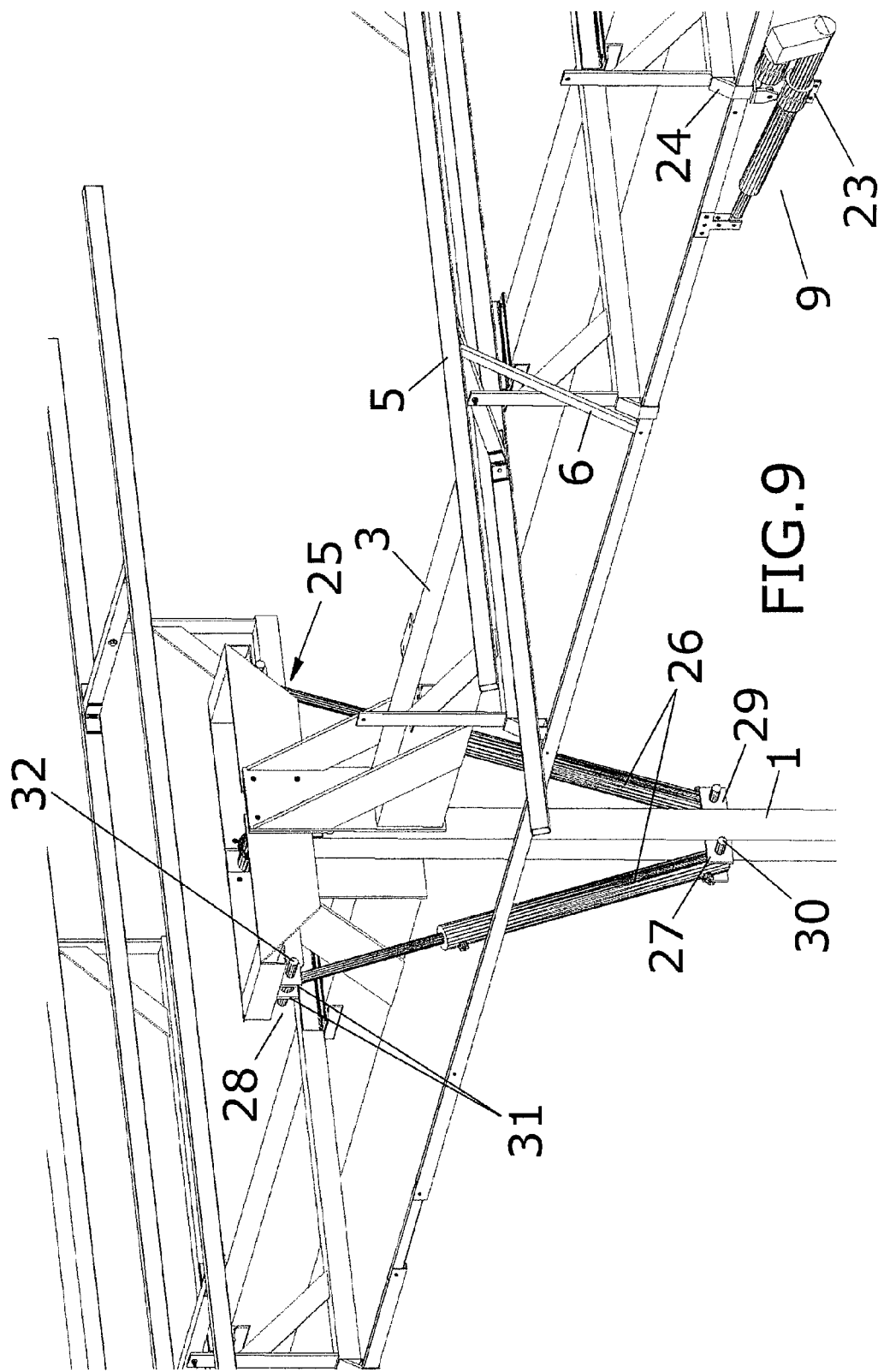

As may be seen in FIG. 9, each one of the articulated connections (27) comprises a double set of flat supports (29) which emerge laterally from the beams, arranged in parallel form and through which a pin (30) passes through the lower end of each of the actuators.

In addition, and in similar manner, the articulated connections (28) comprise respective parallel flat supports (31) which emerge from the lower ends of the force transmission structure (25) through which a pin (32) passes which also passes through the upper ends of the actuators (26).

FIG. 9 and also FIG. 10 indicate the means used to obtain rotation of each of the photovoltaic panels (2) by means of a single actuator (9) which displaces the slide (7) to which the connection rods (6) of each of the secondary substructures (5) are attached, all of which is exactly as described.

The essential nature of this invention is not altered by any variations in materials, form, size and arrangement of its component elements which are described in a manner which is no way restrictive but which is sufficient for it to be reproduced by an expert.

The invention claimed is:

1. Dual axle solar tracker having a structure comprising:
a main substructure with rotation capacity with respect to a longitudinal axle in respect of the structure overall
secondary substructures which act as frames on which the panels or photovoltaic modules are jointly affixed to the main substructure and which rotate in respect of an axle transversal to the longitudinal axle
wherein the main substructure comprises a series of posts fixed to the ground and distributed regularly, and beam sections which are arranged between the posts and joined to each other by intermediate axles the beam sections are relatively displaced in respect of the longitudinal axle rotation, such that the centre of gravity of the main substructure and secondary substructures remains relatively closer to said longitudinal axle,
wherein the secondary substructure comprises a support and attachment frame for each of the panels or photovoltaic modules which is articulated on the ends of a support apparatus which is "U" shaped and which is also attached on the beam sections wherein on each of the frames the end of a connecting rod fixed with the other end of the rod being attached in an articulated manner on a slide, so that the displacement of said slide causes the rotation of each of the frames in an individual yet simultaneous manner.

2. The dual axle solar tracker according to claim 1 wherein the centre of gravity is below the axle of longitudinal rotation, so that during erection the secondary substructures are not overturned.

3. The dual axle solar tracker according to claim 2, wherein the connection between the consecutive beam sections and the intermediate axle is made by means of terminal vertical parts reinforced by brackets with an attachment board fixed to the upper end of the posts on which another anti-friction board is attached, resting on which the intermediate axle is affixed by means of metal clamps.

4. The dual axle solar tracker according to claim 3, wherein the anti-friction board is made from Teflon.

5. The dual axle solar tracker according to claim 3, wherein jubilee clips are arranged on the sides of the post and at an upper end for fixing the rollers which prevent displacement.

6. The dual axle solar tracker according to claim 2, wherein the main substructure is rotated by means of an initial actuator which is fixed to the post by means of a clamp with the end of the actuator attached to a force transmission structure in order to produce rotation.

7. The dual axle solar tracker according to claim 6, wherein the force transmission structure comprises a pair of transversal bars attached on the ends of the consecutive beams and arranged on both sides of the intermediate axle joined together by another pair of bars connecting the transversal bars, with the activated end of the actuator fixed in an articulated manner to the connection bars of the transversal bars.

8. The dual axle solar tracker according to claim 2, wherein the main substructure is rotated by means of a double set of actuators arranged in a "V" shape which activate a force transmission structure, such that the set of actuators arranged in a "V" shape and the forced transmission structure are contained in a plane perpendicular to the plane containing the longitudinal axle and arranged on a section of intermediate axle.

9. The dual axle solar tracker according to claim 8, wherein the actuators arranged in a "V" shape are hydraulic with interconnecting chambers.

10. The dual axle solar tracker according to claim 9, wherein the actuators arranged in a "V" shape are installed with a pump in the same actuators.

11. The dual axle solar tracker according to claim 9, wherein the actuators arranged in a "V" shape are activated from a centralised hydraulic system.

12. The dual axle solar tracker according to claim 8, wherein the force transmission structure emerges transversally from the longitudinal axle remaining fixed attached to the terminal parts which are fixed on the ends of the beam sections.

13. The dual axle solar tracker according to claim 8, wherein each of the actuators of the double set of actuators in "V" shape is joined at its lower end to the posts by means of an articulated connection, while the upper end of each of the actuators is joined to the force transmission structure by means of an articulated connection.

14. The dual axle solar tracker according to claim 13, wherein the articulated connections of both the upper and lower ends comprise a double set of flat supports arranged in parallel form, emerging from the beam or from the force transmission structure through which a pin passes which also passes through the lower or upper end of the actuators.

15. The dual axle solar tracker according to claim 7, wherein the action on the slide is by means of a second actuator fixed with a clamp to the force transmission structure with its activating end fixed in an articulated manner on the slide.

16. The dual axle solar tracker according to claim 7, wherein the slide is suspended from the force transmission structure by means of a yoke which permits the linear movement of the slide.

17. The dual axle solar tracker according to claim 9, wherein the action on the slide is by means of a second actuator fixed with a clamp on the force transmission structure with its activating end fixed in an articulated manner on the slide.

18. The dual axle solar tracker according to claim 9, wherein the slide is suspended from the force transmission structure by means of a yoke which permits the linear movement of the slide.

* * * * *